United States Patent [19]
Funger et al.

[11] Patent Number: 5,786,280
[45] Date of Patent: Jul. 28, 1998

[54] MOLDED PART AND METHOD OF ITS PRODUCTION

[75] Inventors: Bernhard Funger, Krefeld; Heinz Grüber, Tönisvorst, both of Germany

[73] Assignee: Eduard Küsters Maschinenfabrik GmbH & Co. KG, Krefeld, Germany

[21] Appl. No.: 264,661

[22] Filed: Jun. 23, 1994

[51] Int. Cl.⁶ .................................................. B29C 29/00
[52] U.S. Cl. .......................... 442/64; 442/66; 442/68; 442/70; 442/71; 442/74; 442/84; 442/164; 442/168; 442/171; 428/206; 428/903.3
[58] Field of Search .......................... 428/206, 903.3; 442/64, 66, 68, 70, 71, 74, 84, 164, 168, 171

[56] References Cited

U.S. PATENT DOCUMENTS 4,382,108  5/1983  Carroll et al.

FOREIGN PATENT DOCUMENTS

| | | |
|---|---|---|
| 252546 | 6/1966 | Austria. |
| 2491821 | 4/1982 | France. |
| 61094 | 4/1968 | German Dem. Rep.. |
| 2457848A1 | 6/1976 | Germany. |
| 2722774A1 | 11/1978 | Germany. |
| 39 16 331 | 10/1990 | Germany. |
| 4137744A1 | 5/1993 | Germany. |
| 42 36 909 | 5/1994 | Germany. |
| 60-185823 | 9/1985 | Japan. |
| 833919 | 5/1981 | U.S.S.R.. |
| 1247277 | 7/1986 | U.S.S.R.. |
| 93/24295 | 9/1993 | WIPO. |

*Primary Examiner*—Richard Weisberger
*Attorney, Agent, or Firm*—Kenyon & Kenyon

[57] ABSTRACT

Carpet material with at least a proportion of uncleaned used carpets is shredded to form a fiber-like wooly mass. The carpet material contains a thermoplastic binder with a low melting point, for example polypropylene, which can be derived from the used carpets or be added. Furthermore, a duroplastically hardening binder, for example phenolic resin, is added to the carpet material. The carpet material is compressed to form the molded part or panel with these two binders, at a temperature which lies above the plasticizing point of the thermoplastic binder, but below the plasticizing point of any other thermoplastic components of the carpet material.

8 Claims, 3 Drawing Sheets

FIG. 6
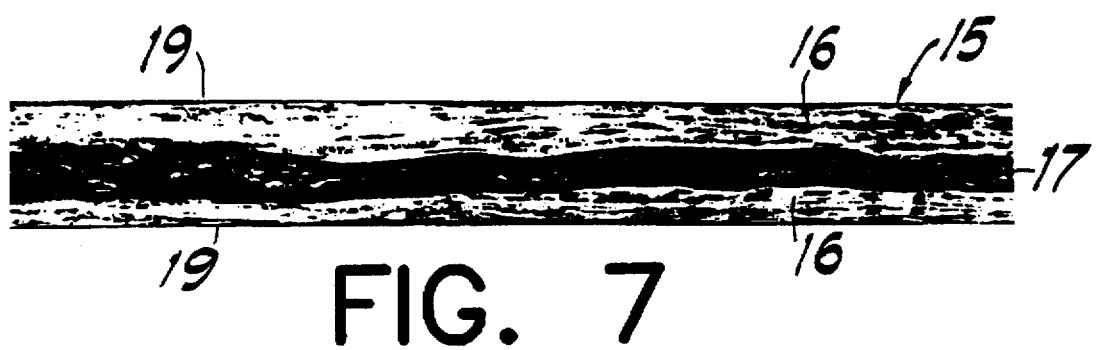
FIG. 7

MOLDED PART AND METHOD OF ITS PRODUCTION

FIELD OF THE INVENTION

The present invention relates to the manufacture of molded parts, and more particularly to molded parts in which a component of the molded part is made from used carpets.

BACKGROUND OF THE INVENTION

The disposal of used carpets, i.e. carpets used in residences or commercial properties for many years and which are then removed and replaced with new carpeting due to wear or renovation, represents a problem of increasing significance. Until now, it has been typical to dispose of used carpets, which are considered special waste in many countries, including the Federal Republic of Germany, in either incinerators or garbage dumps.

However, many countries are considering laws which would make carpet manufacturers responsible for the disposal of used carpets, requiring the manufacturers to take back used carpets in a certain proportion to their current carpet production.

There are particular difficulties when considering possibilities for reusing the textile fiber material in used carpets, one being the fact that a mixture of different types of fiber materials is present in the used carpets which are collected, and another being that the textile fiber material is burdened with foreign substances.

There are two main reasons why different types of textile fiber materials are mixed in a collection of used carpets. One reason is that they can be mixed in the individual carpets themselves. For example, a carpet might have a pile of polyamide or polyester, with a backing of polypropylene. The other reason is that when used carpets are collected for recycling, they typically are bunched together and not sorted with regard to type of fibers. Therefore, all different types of fibers are present in a collection of used carpet. Moreover, the origin and the composition of each individual carpet piece is generally not known and too expensive to determine after collection. The mixture of carpet types has another special aspect, since animal and plant fibers such as wool and cotton might also be present. In other words, in a collection of used carpets, practically everything must be expected with regard to fibers.

With regard to the foreign substances, studies have shown that the burden on the used carpets can be up to 30 percent by weight. This is dirt that has accumulated in the carpet over time, in the form of dust or mineral particles, and also residue from the backing, in other words the foam material and the fillers, as well as adhesive residues.

Efforts to recover the textile portion of the used carpets in a pure form are difficult. The used carpets must be cleaned and the foreign substances, with a proportion of up to 300 kg of these foreign substances per metric ton of used carpets, removed in some way. This labor-intensive process of cleaning and sorting the used carpet material is expensive and time-consuming.

There also have been many attempts to recycle new carpet material, as opposed to used carpet material, in a practical way, for example by compressing it into panels. This new carpet material is generally from waste strips left over from a carpet installation process, or production waste, and does not contain foreign substances. The exact fiber composition of the carpet to be recycled is also known to the manufacturer.

For example, a compressed molded element is described in DE 24 57 585 A1, which can also have the form of a panel, in which installation waste material from new carpets is shredded and allowed to set in the compressed state with a binder. The binder can contain phenolic resin, among other things, but can also be a foamable binder. The panel can have a cover layer of paper, textile material, plastic, wood or similar material. Another attempt of this type is the object of DE 27 22 774 A1, in which the use of installation waste from car carpets and needle-punched felts which contain thermoplastic components is described. The waste is shredded, arranged in a layer and heated above the melting point of part of the thermoplastic components, compressed and cooled. As an example for the thermoplastic components, polyethylene and polypropylene are named, both of which are already sufficiently capable of flow at 160° to 180° C. to penetrate the entire mass and form a homogeneous compressed element.

DD-PS 61 094 and AT-PS 25 25 46 also deal with the compression of installation or production waste to form panels.

What all the attempts mentioned above have in common is that they are aimed at the use of production and installation waste, in other words at unused material of the same composition, even if different types of fibers are mixed. These attempts did not approach or consider the problem of foreign substances, which may comprise up to 30 percent by weight of the used carpet and which influence the bonding of the panels and their mechanical properties.

DE 41 37 744 A1 describes processing used carpets by pressing and melting a panel of thermoplastic carpet components, especially in areas close to the surface, in order to form a type of carrier layer of a laminate material. However, it has been shown that the panels produced according to DE 41 37 744 A1 require further improvement in terms of their mechanical properties.

SUMMARY OF THE INVENTION

An object of the present invention is to allow for the permanent disposal of used carpets, with minimum effort.

Another object of the invention is to provide a strong and resilient molded part.

The present invention therefore provides a molded part comprising: finely-shredded carpet fiber material, at least a portion of which comes from used carpets; a thermoplastic binder, preferably in a proportion of 5 to 30 percent by weight of the molded part; and a duroplastically hardening binder, preferably in a proportion of 1 to 15 percent by weight of the molded part. Stated another way, the molded part comprises: finely-shredded carpet material; fine-particle foreign substances up to 30 percent by weight of the molded part; a thermoplastic binder; and a duroplastically hardening binder. The foreign particles may come from shredded used carpets.

The present invention also provides a method for making the molded part, including shredding used carpet material into a predominantly fibrous wooly material and compressing the carpet material in the presence of a thermoplastic binder, preferably in a proportion of 5 to 30% of the weight of the total mass to be compressed, and a duroplastically hardening binder, preferably in a proportion of 1 to 15 percent by weight of the total mass to be compressed. The entire mass is then heated to a temperature which lies just above the melting point of the thermoplastic binder, but below the melting point of any other thermoplastic components contained in the total mass. The thermoplastic binder can either be added or come from the carpet material.

The molded parts according to the invention—primarily but by no means exclusively panels—have an astonishing bending resistance, in other words the material has a high modulus of elasticity. For instance, using one's hands, it is almost impossible to bend a 6 mm thick, 20 cm square panel of the material according to the invention by an amount of more than the thickness. It cannot be broken by hand.

The interaction of several characteristics is important for the high bending resistance.

First of all, the carpet material has to be shredded so intensively that the shredded product does not resemble carpeting in any way. This shredding results in breaking the carpet material down into its individual fibers, so that the shredded product becomes a type of coarse wadding, which is what is meant by the term "fibrous wooly material."

If this shredded material is compressed with a thermoplastic binder which melts at the processing temperature, it is entirely penetrated by the thermoplastic binder, and the thermoplastic binder forms a type of matrix in which the fibers form embedded reinforcement elements, so that a type of laminate material results. Because of the fine shredding of the carpet material, the volume of the finished molded part is penetrated quite homogeneously by fibers, so that no large unreinforced zones occur, and the molded part appears homogeneously reinforced on the outside.

However, the particularly surprising thing is the advantageous interaction of two types of bonds, namely the one via the thermoplastic components of the total mass and the one via the duroplastically hardened binder. The same resin-like compounds which are also used in the production of chip board are possible for use as the duroplastically hardened binder.

In the case of different type of fiber material, namely wood (cellulose fibers), the simultaneous presence of thermoplastic and duroplastic binders is evident from DE 32 33 385 C2. In this connection, however, these different binders are arranged in different layers of a multi-layer laminate material, so that they do not interact at the same location with one another.

Another advantageous result in connection with the invention, which would not have been expected by one skilled in the art, consists of the fact that a high proportion of foreign substances in the used carpets is recycled. In other words the dirt, the foam residue and the adhesive residue is integrated into the molded parts without problems, and has a rather positive influence on the strength properties of the material. Using the method according to the invention, it is possible to process used carpets in the condition in which they were delivered, and to produce the molded parts according to the invention from them without complicated cleaning and separation processes.

The molded parts have a good surface quality and can frequently be used as they come from the press. The thermoplastic component, which penetrates all the interstices of the material under pressure and seals the surface, is probably responsible for this.

There are several reasons why the material in the press is not heated to such a point that all the thermoplastic components melt: first, a proportion of fibers should maintain their fiber structure and intermesh in order to act as a reinforcing laminate material in the finished material. Second, the melting of all thermoplastic components requires high temperatures which are difficult to achieve with present heating liquids for presses. The high temperatures are also not desirable because of heat losses. Instead, it is desirable to heat the material just to the point where the lowest melting and plasticizing ranges of the thermoplastic binder are exceeded. This allows for development of the bonding mechanism via melting and distribution of these thermoplastic components throughout the entire material under pressure.

The compression period is selected so that thermoplastic bonding and the interaction with the duroplastically hardening binder takes place as uniformly as possible over the thickness of the molded part.

The heat must be introduced into the compressed mass, which has poor heat conductivity, from the compressed surfaces of the mass, requiring a certain amount of time until the temperature in the interior has also increased to a value sufficient to melt the thermoplastic binder.

One thermoplastic binder which may be used in light of these considerations is polypropylene, which frequently occurs in modern wall-to-wall carpeting, for example as the backing material. It has a plasticizing point in the range of approximately 160° C. and achieves a relatively low viscosity, which promotes distribution through the fiber mass.

In cases where the carpet material available comprises sufficient thermoplastic binders on its own, the carpet material can be used in the state in which it is delivered. All that is then needed is the addition of the duroplastically hardening additional binder.

If, however, the inherent content of thermoplastic binder with a low melting point in the carpet material is too low, such a binder can also be added to the carpet material. For example, thermoplastic binder in the form of pure waste material can be added, for instance carpet scraps from production or installation.

Although the problem of used carpets was the starting point of the invention, it is not limited to the exclusive use of such used carpets, rather only a certain proportion of such used carpets must be present. Other new carpet scraps or other small-particle scrap can also be added to them.

Possible duroplastically hardening binders include urea formaldehyde resin, melamine formaldehyde resin, phenolic formaldehyde resin or isocyanate, among others, and others known from chip board technology, in other words for binding of wood masses.

An important development of the invention which results in a further significant gain in bending strength, i.e. modulus of elasticity, is the addition of fiber-like wood chips in a homogeneous distribution and random orientation, preferably in a proportion of 10 to 50 percent by weight of the molded part.

The wood chips added preferably have a size distribution with a thickness maximum at approximately 0.2 to 0.4 mm and a coefficient of fineness of approximately 1:10 to 1:100. In other words this can be material ground in a refiner, similar to the starting material for MDF (Medium Density Fibers) panels.

Instead of being produced from a uniformly mixed starting material and accordingly demonstrating uniform properties throughout the entire volume, the molded part can also have a varying composition profile over its thickness. This can be achieved by a varying the composition of the shredded starting material.

For example, the binder proportion—either the thermoplastic binder or the duroplastically hardening binder or both—can be increased in the vicinity of at least one surface. This results in a particularly homogeneous and sealed surface.

Also, the content of fiber-like wood chips can be greater in the vicinity of at least one surface. This distribution results in a more wood-like surface of the molded part, which is sometimes desirable. It also results in an increased modulus of elasticity, particularly in the area close to the surface, due to the laminate effect, and thus promotes the bending resistance in a particularly effective manner.

The finished compressed molded part can have a coating on at least one surface, which in turn can possess a sealed surface, for example in the form of a powder coating or a varnish.

The molded part can also carry a cover layer, that is a thick layer of a separate material on at least one side, which in turn can consist of an areal formation that can be rolled.

A particularly important embodiment has a cover layer which comprises flat, thin wood chips which are arranged essentially parallel to the molded part surface, with a random fiber direction. These wood chips preferably have a thickness of 0.1 to 0.3 mm and an outline essentially in the shape of a rectangle, the length of which is 2 to 10 cm and the width of which is 2 to 30 mm. However, other dimensions are possible.

This results in a new type of material with an attractive exterior formed by wood chips. With a cover layer of such wood chips, the interaction with the plasticizable carpet material provided with the thermoplastic binder is of great importance. After spreading, the wood chip layer has a very non-uniform texture. It is pressed down by compression. Test results show that molded parts with a smooth, almost even surface can be produced, and that these can be used without further processing. The irregularities of the layer thickness which result from the random arrangement of the flat wood chips are pressed away towards the inside and are absorbed by the thermoplastic carpet material. Therefore, while the exterior surface is smooth, the interior surface of the chip layer which faces the compressed carpet material is irregular and undulating, but this can be equalized by the plasticized carpet material. This material is new in type and possesses very advantageous properties, as well as an innate decorative value, which permits its use without further refining.

The properties of the invention described until now are independent of the shape of the molded part. This means that corresponding compression molds can be used in the production of the material by compression, resulting in paneling and acoustical elements and similar items.

However, a significant embodiment of the invention is a molded part in the form of a panel, which can be pressed in a heated double-band press, for example.

In this case, the cover layer can already be brought together with the molded part while it is being produced, for example in that a cover layer present in the form of a rollable strip also passes through the double-band press.

In another embodiment, the cover layer can be laminated onto the finished molded part.

In this case, the molded part and the cover layer are jointly passed through a suitable press or a roller gap, resulting in bonding the two components together to form the finished panel.

The cover layer can consist of any suitable material, e.g. plastic, paper impregnated with synthetic resin, wood and metal, e.g. aluminum or copper.

A particularly interesting case in this connection is a panel where the cover layer consists of a sheet of corrosion-resistant steel.

Such a material is useful if a wall is subject to corrosive forces and at the same time is supposed to demonstrate good heat insulation. This is the case, for example, if the wall surrounds a room with an aggressive atmosphere, particularly a room which is at a raised or lowered temperature. For example, it is advantageous to produce damper walls which have a relatively large area and mostly demonstrate a temperature difference of 80° C. between the inside and the outside, along with the corresponding heat loss, from the laminate material according to the invention. The corrosion-resistant sheet can then be selected to be significantly thinner than in previous constructions, where the rigidity had to be produced by the sheet metal alone. In the laminate material according to the invention, the panel compressed from the carpet scraps makes a significant contribution to the rigidity and furthermore significantly increases the heat insulation and acoustical insulation as compared with the sheet metal alone.

The starting material used to produce the molded part according to the invention or the panel, made from shredded carpet scraps, is not without problems in terms of its structure. It consists of the textile fibers which form the fibrous (fiber-like) wooly material that has been mentioned, and the foreign substances present in the used carpets, which contain a certain proportion of mineral dirt substances. These substances have a tendency to fall down through the wooly material, so that an uneven composition of the molded part or the panel frequently occurs when the mat to be compressed is spread out, because the foreign substances collect on the bottom layer.

In order to avoid this effect, it has proven to be practical if the molded part contains wax or stearin, preferably in a proportion of 0.5 to 2% by weight of the used-carpet portion of the molded part, which has been added to the total material to be compressed before it is spread, for example by spraying it on as an emulsion or in another liquefied form. Mixing with the wax or stearin can take place during shredding of the carpet material, for example during grinding, or in a separate mixing process which follows shredding. Surprisingly, it has been shown that an addition of wax or stearin results in a significant reduction in demixing of the foreign substance components and the fiber components of the total material to be compressed, so that the undesirable uneven composition of the molded parts or panels can be almost completely suppressed.

The used-carpet material can also be used to form multi-layered panels, with at least one of the layers made of the used-carpet material. The layers preferably have a thickness of 1 to 4 mm, each of which borders, on both sides, on an areal formation consisting of another material, preferably in the same thickness range.

In this connection, a relatively thin panel material can be produced from the carpet scraps and be joined together with areal formations of a comparable thickness, especially heavy wood veneer, to form a laminate material similar to plywood, with the layer thickness being freely selected depending on the purpose of use, and with every other layer consisting not of the areal formation, i.e. the veneer, but rather of the used-carpet material layer. This panel material demonstrates a wood-like appearance with its surfaces, but saves a lot of wood by means of the use of the used-carpet material according to the invention in the interior.

It should be noted that with all the embodiments of the molded part mentioned above which have more than one layer or which have a varying composition over the thickness of the molded part, the preferred composition by weight of the binders and waxes is only for the portion of the molded part made from used-carpet fibers. For instance, with multi-layer panelling, it is the layers made from used-carpet which preferably have a thermoplastic binder composition of 5 to 30 percent by weight.

The method of making the substance includes finely shredding a used carpet material, adding a duroplastically hardening binder to the shredded used-carpet material before pressing, and can include adding thermoplastic binder to the used carpet material. The thermoplastic binder preferably comprises 5 to 30 percent by weight of the used-carpet layer mass to be compressed, and the duroplastically hardening binder preferably comprises 1 to 15 percent by weight of the used-carpet layer.

The used-carpet material can first be chopped into pieces with the largest dimensions in the range of 5 to 15 cm, and then subsequently ground or torn. The grinding can also be accompanied by a sieve, in which the material is ground until the carpet material passes through the sieve, which can have a selected fineness.

An additive of wax or stearin can also be added before the used-carpet material is compressed, preferably in a proportion of 0.5 to 2 percent of the weight of the total used-carpet mass to be compressed. The wax or stearin can be added during the grinding process.

The total mass can also be spread out and then have a substance added to one side before processing, so that a varying composition profile over the thickness of the compressed mass results.

A variety of different substances, as discussed above, can be added to the used-carpet mass to be compressed, or can be layered together with the used-carpet mass.

BRIEF DESCRIPTION OF THE DRAWINGS

The invention will be explained in greater detail using the following drawings:

FIG. 6 shows a view of a panel material according to the invention with a cover layer of flat, thin wood chips;

FIG. 7 shows a cross-section of the panels in FIG. 6 in approximately 1.5 times enlargement;

DETAILED DESCRIPTION OF THE DRAWINGS

The carpet material reproduced in FIG. 1 consists of used carpets which have been chopped in a chopper, into pieces with a size of approximately the palm of a hand, and subsequently have been finely ground in a mill, with no kind of cleaning taking place and with the burden of foreign substances, particularly dirt, sand and other mineral particles, which amounts to as much as 30% of the weight, remaining in the material.

Shredding by means of grinding goes so far that the carpet structure is entirely lost and only a fibrous wooly material remains, which agglomerates to form small, loose wads 1 when it passes through the exit sieve of the mill. In the embodiment shown, the carpet had a polyamide pile and a strip backing of polypropylene. The backing particles 2 are still recognizable as a different material.

The thermoplastic components to be melted as the thermoplastic binder make up about 5 to 30 percent by weight of the ground used carpets, about 20 percent by weight in the embodiment shown. It should be noted that so long as the used-carpet component makes up a major portion of the molded part, it is often sufficient to estimate the thermoplastic binder component portion present in the used-carpet as that of the entire molded part. Therefore, a thermoplastic binder component of 5 to 30 percent by weight of the used-carpet to be processed, as opposed to the total weight of the molded part, is also possible.

Figure 1:
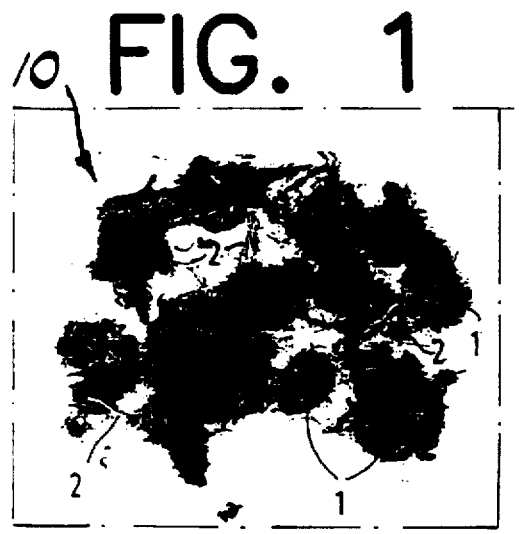
FIG. 1 shows a view of the carpet material to be compressed according to the invention.
Figure 2:
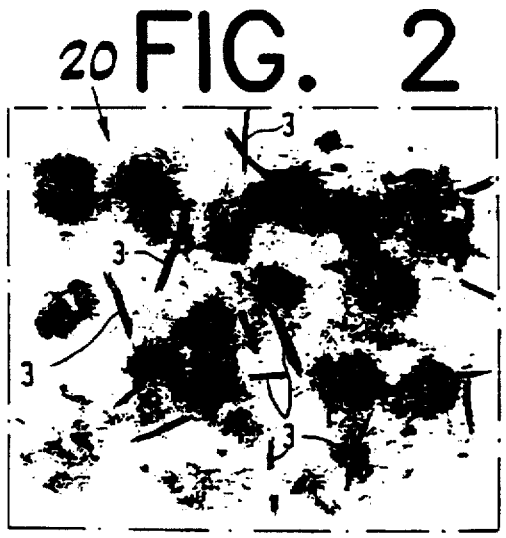
FIG. 2 shows a view of the same material with an addition of fiber-like wood chips.

While the carpet material 10 of FIG. 1 contains only components of used carpets, the carpet material 20 in FIG. 2 has fiber-like wood chips 3 added to it in a proportion by weight of 35% of the used-carpet molded part.

The carpet materials 10 and 20 contain sufficient polypropylene, in themselves, which serves as a thermoplastic binder. If this were not the case, then additional polypropylene or a comparable thermoplastic binder has to be added.

In addition, a phenolic resin or a similar resin-like, duroplastically hardening binder is added, preferably in a proportion of 1 to 15 percent by weight, to the carpet material 10 or 20 in each instance, using known techniques.

Figure 3:
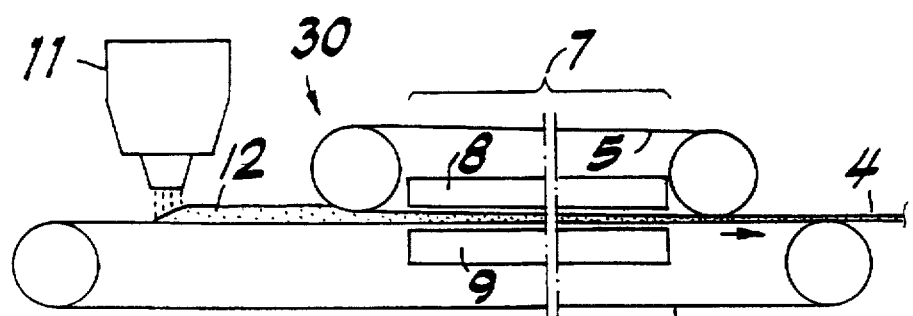
FIG. 3 shows a schematic side view of a double-band press for the production of panel material according to the invention.

This starting material is compressed in the double-band press 30 of FIG. 3 to form a panel web 4. The double-band press 30 comprises an upper die band 5 and a lower die band 6 made of sheet steel, which bands run continuously over deflection rollers and advance in the direction of the arrow, at the same speed, facing each other, in a compression segment 7. In the region of the compression segment 7, the advancing die bands 5, 6 are supported by means of corresponding devices 8, 9, which are only indicated schematically, and heat can be transferred through the die bands 5, 6 onto the panel web 4 which forms.

Figure 4:
FIG. 4 shows a view of a panel surface.
Figure 5:
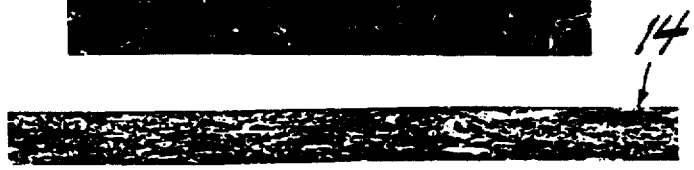
FIG. 5 shows a panel cross-section through a panel according to the invention, in approximately 1.5 times enlargement.

The bottom die band 6 is preceded by a spreading segment, in which a mat or bulk mass 12 of the carpet material is spread on the die band 6 from a spreading device 11. The bulk mass 12 at this point is still loose, and contains the two binders (thermoplastic binder and duroplastically hardening binder). The bulk mass 12 is compacted as it enters between the die bands 5, 6 and hardened in the compression segment 7, according to a predetermined time-temperature-pressure diagram. The finished, hardened panel web is cooled in the last section of the double-band press or in a separate subsequent cooling device, and can then be cut to size. As shown in FIG. 4, a panel 14 taken from the panel web 4 has a marbled appearance with a dense, rather smooth surface. No structural difference is visible to the eye over the thickness of the panel 14, as FIG. 5 shows. In the present embodiment, as homogeneous as possible a distribution of the components was the goal.

By arranging several spreading devices 11 behind each other in known manner, a structured profile can be produced over the panel thickness, for example by spreading a layer with a higher proportion of polypropylene or a layer of an adhesive-coated wood material on the bottom, then placing the main layer of the carpet material 10 on that and applying a layer with more polypropylene or with wood on the top.

These layers are compressed together and then result in a structured panel.

In order to determine the influence of the individual components qualitatively, bending tests were conducted. The underlying panels 14 had a thickness of 6 mm and a specific weight of 950 kg/m³. The pile of the carpet material used consisted of polyamide, the backing of polypropylene, which was brought to a proportion of 20 percent by weight of the carpet material by adding polypropylene scrap. An additive of 10 percent by total weight of phenolic resin as the duroplastically hardening binder was added to this carpet material. The values for modulus of elasticity as summarized in the following table were calculated from the bending values.

| Carpet material polyamide | polyamide | polyamide |
|---|---|---|
| Thermoplastic polypropylene binder | — | polypropylene 20% |
| | 20% | |
| Duroplastically phenolic hardening binder | phenolic resin 10% | — resin 10% |
| modulus of elasticity (N/mm²) | 450 | 590 | 960 |

The lowest value was produced by a bond with only phenolic resin. A bond with polypropylene alone already showed a clear increase in the modulus of elasticity. A bond with both polypropylene and phenolic resin resulted almost in doubling of the modulus of elasticity. The two different types of binders therefore obviously interact in a special way to increase the shape rigidity of the product produced.

Bending tests were also conducted with panels with a thickness of 6 mm and a specific weight of 950 kg/m³, which were produced from the carpet material 20, in other words with an addition of fiber-like wood chips. The result is reproduced in the following table.

| | Test 1 | Test 2 |
|---|---|---|
| Carpet component | | |
| Mixture: 80% polyamide 20% polypropylene | 65% | 85% |
| Wood component | 35% | 15% |
| Phenolic resin | 5% | 5% |
| Modulus of elasticity (N/mm²) | 1,620 | 950 |

Here, the addition of phenolic resin was 5% of the total carpet material, which had the composition as indicated. It was shown that increasing the wood addition from 15 to 35% of total weight results in almost double the modulus of elasticity, with the value in the latter case being far above the wood-free modulus of elasticity of 960 N/mm² which was achieved using twice the amount of expensive phenolic resin. The addition of wood therefore significantly improves the bending resistance and shape retention of the panels produced.

FIGS. 6 and 7 show a panel 15 which consists of a cover layer 16 on both sides, composed of large (FIG. 6 has a scale of 1:1), flat and very thin wood chips with a thickness of approximately 0.2 mm and an essentially rectangular outline. In the production of the panel 15, the bottom cover layer 16 with adhesive coated chips 18 is first spread out, then the middle layer 17 of the shredded carpet material and binders is spread on that, and the top cover layer of the adhesive-coated, thin chips 18 is spread on top of that. The whole thing is passed through the double-band press 30. The tangled distribution of the chips 18 results in random differences in the local accumulation of wood material, therefore resulting in different layer thicknesses of the cover layers 16 at a certain compression pressure. Since the middle layer 17 of the carpet material according to the invention (it is this layer has the preferred binder percentages mentioned above), demonstrates strong thermoplastic properties when pressure and heat are applied in the compression segment 7, the thickness profile of the layers 16 is pressed into the inside, as is evident in FIG. 7, while the outer surfaces 19 remain practically even. A laminate material that is very resistant to bending is obtained, with the interesting surface evident from FIG. 6, which is even and flat despite random spreading. The surfaces demonstrate only slight steps with a height of 0.2 mm, if any, at the edges of the uppermost chips 18, but otherwise are practically even.

Figure 8:
FIG. 8 shows a cross-section through a panel material comprised of several layers of the panel material according to the invention.

The panel material 40 of FIG. 8 is composed of three thin panels 14 according to FIGS. 4 and 5 with one thickness, and four veneer layers of approximately the same thickness, like plywood. The thickness of the individual layers comprises approximately 1 to 4 mm, 2 mm in the embodiment. In the veneer layers 21, the fiber direction runs parallel to the plane of the drawing, in the veneer layers 21', it runs perpendicular to the plane of the drawing. Each panel layer 14 has a wood layer 21, 21' on both sides. By combining different amounts of layers, panel materials with a different thickness can be produced and adapted to changing needs.

Production can take place in such a way that a standard panel 14 with a certain low thickness is produced and is adhesively bonded under pressure, i.e. laminated, to the corresponding veneer layers, in the desired number. However, it is also possible to pass the veneer layers 21, 21' through the double-band press 30 together with the spread material for the panel layers 14, so that the panel material is produced in one pass.

For the production of the panels 14 according to FIGS. 4 and 5, a double-band press according to DE-PS 21 57 764 was used. The temperature of the die bands 5, 6 according to FIG. 3 was approximately 200° C., the pressure in the compression segment 7 was approximately 500 N/mm².

The time during which the carpet material was subject to this temperature and this pressure was 90–180 seconds.

While the present invention has been detailed in the embodiments described above, it is contemplated the invention may encompass further embodiments than those described, in particular, the used-carpet material may be molded into various shapes.

What is claimed is:

1. A molded part comprising:
   a coarsely wadded carpet material, at least a portion of which comes from used carpets;
   a wax or stearin;
   a thermoplastic binder in a proportion of 5 to 30 percent by weight of the molded part; and
   a hardening binder in a proportion of 1 to 15 percent by weight of the molded part.

2. The molded part as recited in claim 1 wherein the thermoplastic binder is polypropylene.

3. The molded part as recited in claim 1 wherein the hardening binder is at least one member selected from the group consisting of urea formaldehyde resin, melamine formaldehyde resin, phenolic formaldehyde resin and isocyanate.

4. The molded part as recited in claim 1 further comprising a coating on at least one surface.

5. The molded part as recited in claim 4 wherein the coating possesses a sealed surface.

6. The molded part as recited in claim 1 further comprising a cover layer on at least one side.

7. The molded part as recited in claim 6 wherein the cover layer is a sheet.

8. The molded part as recited in claim 1 wherein the wax or stearin is in a proportion of 0.5 to 2 percent by weight.

* * * * *